United States Patent
Thubert et al.

(10) Patent No.: US 11,172,041 B2
(45) Date of Patent: Nov. 9, 2021

(54) COMMUNICATION PROXY FOR DEVICES IN MOBILE EDGE COMPUTING NETWORKS

(71) Applicant: Cisco Technology, Inc., San Jose, CA (US)

(72) Inventors: Pascal Thubert, Roquefort les Pins (FR); Robert Edgar Barton, Richmond (CA); Jerome Henry, Pittsboro, NC (US); Eric Levy-Abegnoli, Valbonne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 43 days.

(21) Appl. No.: 16/545,225

(22) Filed: Aug. 20, 2019

(65) Prior Publication Data

US 2021/0058478 A1 Feb. 25, 2021

(51) Int. Cl.
| | |
|---|---|
| *H04L 29/08* | (2006.01) |
| *H04L 29/12* | (2006.01) |
| *H04W 88/18* | (2009.01) |
| *H04W 84/22* | (2009.01) |
| *H04L 12/26* | (2006.01) |

(52) U.S. Cl.
CPC ...... *H04L 67/2833* (2013.01); *H04L 61/2015* (2013.01); *H04L 67/12* (2013.01); *H04L 43/00* (2013.01); *H04W 84/22* (2013.01); *H04W 88/182* (2013.01)

(58) Field of Classification Search
CPC .............................. G06F 3/04847; G09B 5/00
See application file for complete search history.

(56) References Cited

U.S. PATENT DOCUMENTS

| | | | | |
|---|---|---|---|---|
| 2007/0011349 | A1* | 1/2007 | Gaug | H04L 43/00 709/238 |
| 2011/0081006 | A1* | 4/2011 | Hao | H04M 3/53333 379/88.13 |
| 2013/0080542 | A1* | 3/2013 | Peng | H04L 67/12 709/206 |
| 2014/0073367 | A1* | 3/2014 | Chou | H04W 4/14 455/466 |
| 2015/0124622 | A1 | 5/2015 | Kovvali et al. | |
| 2018/0139691 | A1 | 5/2018 | Onishi et al. | |

(Continued)

FOREIGN PATENT DOCUMENTS

WO  2017117044 A1  7/2017

OTHER PUBLICATIONS

A. Minaburo et al., "LPWAN Static Context Header Compression (SCHC) and fragmentation for IPv6 and UDP", lpwan Working Group, Dec. 14, 2018, 76 pages.

(Continued)

*Primary Examiner* — Barbara B Anyan

(74) *Attorney, Agent, or Firm* — Edell, Shapiro & Finnan, LLC

(57) ABSTRACT

Presented herein are techniques that aggregate messages using a subroot node. A plurality of messages is received from a corresponding plurality of nodes by a subroot node acting as a proxy in a wireless mesh sub-network. The plurality of messages is aggregated into a single message according to a template. The single message is wireless transmitted to a root node, wherein the root node has a wired connection to a network.

20 Claims, 6 Drawing Sheets

(56) References Cited

U.S. PATENT DOCUMENTS

2018/0263039 A1   9/2018  Fang et al.
2019/0097900 A1   3/2019  Rodriguez et al.
2019/0294124 A1*  9/2019  Law .................. G05B 19/4185

OTHER PUBLICATIONS

N. Sornin, Ed. et al., "Static Context Header Compression (SCHC) over LoRaWAN", lpwan Working Group, Apr. 19, 2019, 15 pages.
T. Mrugalski et al., "Dynamic Host Configuration Protocol for IPv6 (DHCPv6)", Internet Engineering Task Force (IETF), ISSN: 2070-1721, Nov. 2018, 154 pages.
Cisco, "Configuring DHCP Proxy", Cisco Wireless LAN Controller Configuration Guide, Release 7.4, 4 pages.

* cited by examiner

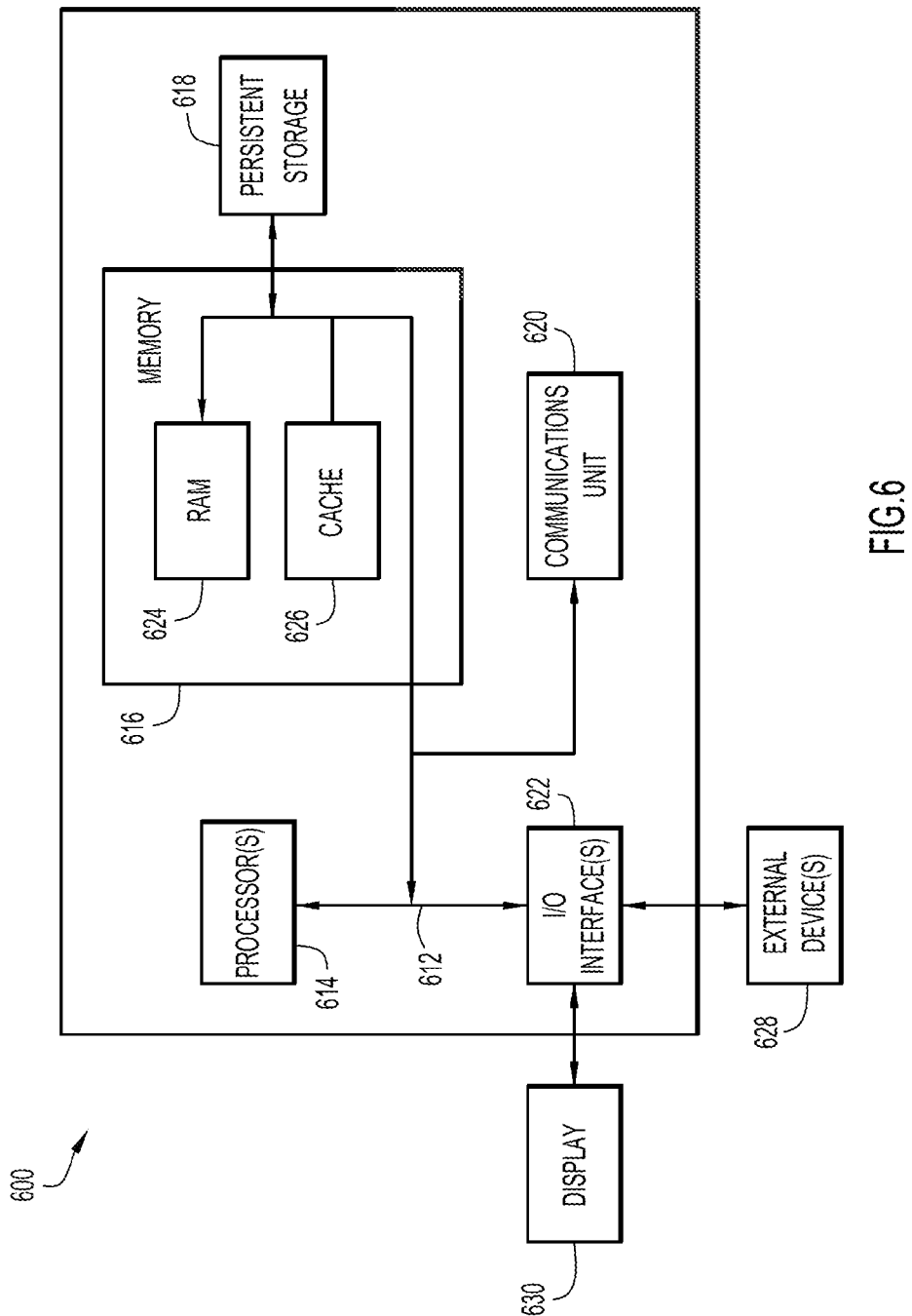

COMMUNICATION PROXY FOR DEVICES IN MOBILE EDGE COMPUTING NETWORKS

TECHNICAL FIELD

The present disclosure relates to a communication proxy for devices in a mobile edge computing network.

BACKGROUND

Mobile edge computing is a network architecture in which computing tasks may be performed by devices at the edge of a cellular or other network. Devices that participate in mobile edge computing may communicate with each other via a wireless mesh network, which can extend network coverage to remote devices in a manner that enhances reliability via route redundancy. Moreover, a wireless mesh network can extend network coverage without necessitating an increase in transmission power or receiver sensitivity, thereby enhancing the battery life of devices. By configuring devices to operate in a wireless mesh network, data can be gathered from distant locations or from locations that are difficult to access. For example, a wireless mesh network of devices may be deployed in order to obtain metering data for the purpose of tracking consumption of utilities (e.g., electricity, water, natural gas, etc.). However, a high density of computing devices may lead to improper functioning of individual devices, which may cause devices to not properly form a mesh network.

BRIEF DESCRIPTION OF THE DRAWINGS

FIG. 6 is a block diagram depicting a computing device configured to perform the methods presented herein, in accordance with an example embodiment.

DESCRIPTION OF EXAMPLE EMBODIMENTS

Overview

In one embodiment, a computer-implemented method provides aggregation of communications for a mesh sub-network. A subroot node acting as a proxy in a wireless mesh sub-network receives a plurality of messages from a corresponding plurality of nodes. The plurality of messages is aggregated into a single message according to a template. The single message is transmitted to a root node, wherein the root node has a wired connection to a network.

Example Embodiments

The present disclosure relates to a communication proxy for devices in a mobile edge computing network. A group of mobile edge computing devices, referred to as nodes, may be configured to operate as a wireless mesh network for the purpose of collecting and transmitting data. For example, nodes may include smart meters that collect data related to utility consumption of units in an apartment building or office complex. Nodes may transmit collected data along a wireless mesh network until the data is received by a root node that is connected to a wired network, such as an intranet or the Internet. The root node may then forward the received data to a particular destination, such as a server associated with a utility provider.

However, nodes may often be situated in subterranean vaults or other areas that hamper wireless communication between the nodes in the vault and external nodes. In order to reliably communicate with an external node, the transmission strength of individual nodes in the vault may be increased. However, when multiple nodes that are in close physical proximity to each other transmit at elevated power levels, the nodes may desensitize each other, preventing the nodes from functioning properly as a mesh network.

Present embodiments address this issue by forming a sub-network of nodes in which a node may act as a subroot node for other nodes in the area. The subroot node may serve as a proxy between the nodes in the sub-network and an external node by serializing upstream communications. For example, after a power loss event, individual nodes may transmit power-on notices to an external destination. Instead of sending multiple messages individually, the subroot node may aggregate the messages received from each node into a single message. Similarly, the subroot node may serve as a proxy by aggregating multiple requests of nodes to be assigned network addresses. Thus, present embodiments reduce the amount of collisions and related delays in a mobile edge computing network. Moreover, by eliminating the need for nodes to transmit at higher power levels, the power consumption of nodes may be reduced, which is particularly beneficial in the case of battery-powered devices.

Figure 1:
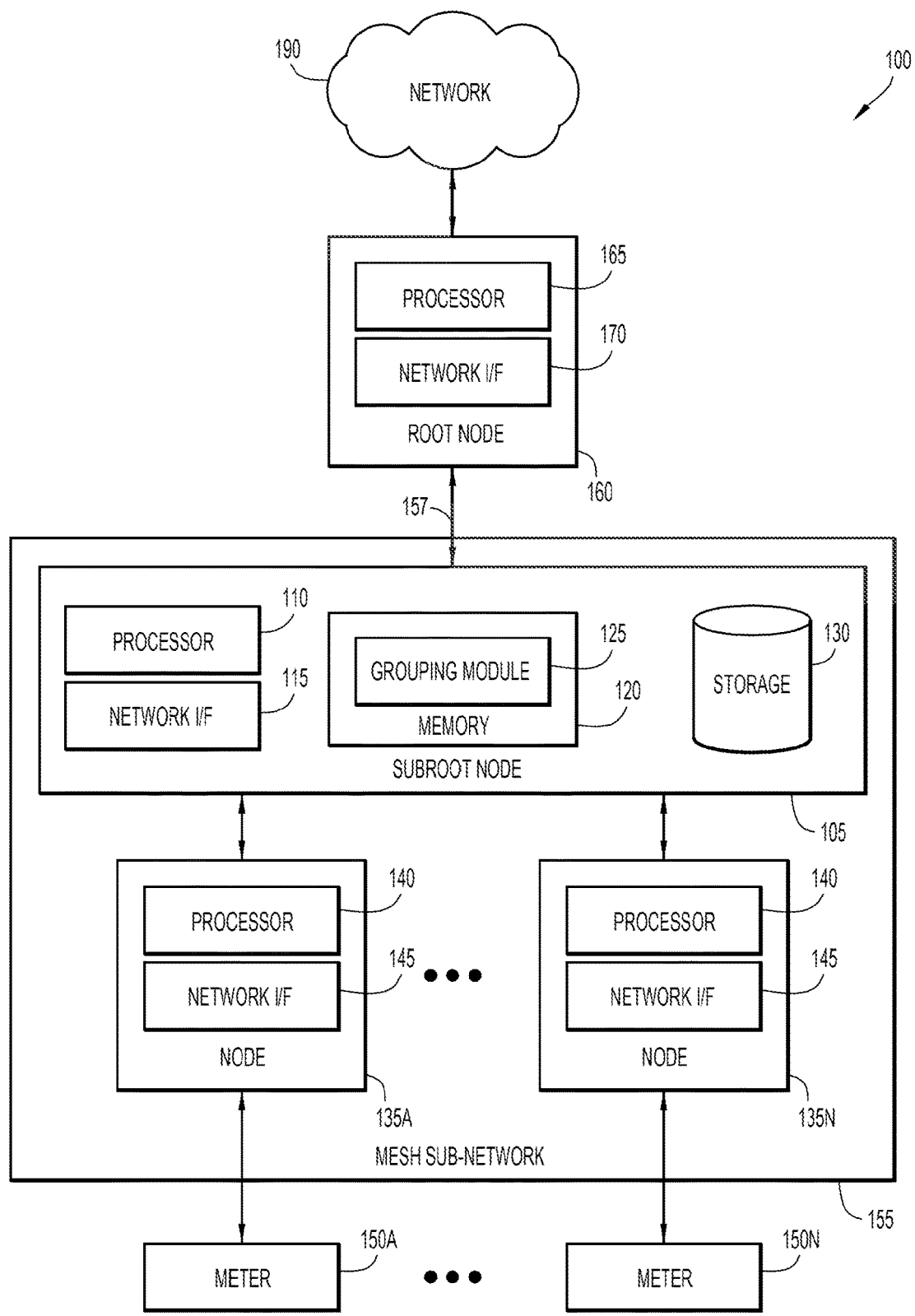
FIG. 1 is a block diagram depicting an environment for aggregating communications in a wireless mesh network, in accordance with an example embodiment.

Embodiments are now described in detail with reference to the figures. FIG. 1 is a block diagram depicting an environment 100 for aggregating communications in a wireless mesh network, in accordance with an example embodiment. As depicted, environment 100 includes a subroot node 105 and a plurality of nodes 135A-135N in a mesh sub-network 155, and a root node 160 in communication with network 190. Each node 135A-135N may be associated with a particular meter of meters 150A-150N. Subroot node 105 may act as a proxy by aggregating data from nodes 135A-135N and relaying the aggregated data to root node 160 via a wireless path 157. Wireless path 157 may include a route through one or more additional wireless mesh networks or sub-networks. In some embodiments, wireless path 157 includes a constrained mesh network. Wireless path 157 may correspond to one or more low-power wide-area network (LPWAN) hops using a protocol such as Long Range (LoRa) or narrowband Internet of Things (NB-IoT). It is to be understood that the functional division among components of environment 100 have been chosen for purposes of explaining the embodiments and is not to be construed as a limiting example.

Each node 135A-135N includes a processor 140 and a network interface (I/F) 145. In various embodiments, each node 135A-135N may include any programmable electronic device capable of executing computer readable program instructions. In particular, nodes 135A-135N may be mobile edge computing devices capable of forming a mesh sub-network 155. Network interface 145 may include one or more network interface cards that enable the nodes 135A-135N to wirelessly send and receive data over mesh sub-network 155. Each node 135A-135N may include internal and external hardware components, as depicted and described in further detail hereinafter with respect to FIG. 6.

Nodes 135A-135N may collect information from meters 150A-150N (or other sensor/data collection devices) and may pass the collected information to subroot node 105 via mesh sub-network 155. Meters 150A-150N may include any devices capable of performing qualitative and/or quantitative measurements. In particular, a meter may perform a measurement of some feature of its environment, such as a temperature measurement, a relative humidity measurement, an irradiance measurement, and the like. Meters 150A-150N may measure a consumption amount or a rate of consumption of a particular resource, such as electricity, water, natural gas, data, and the like. Nodes 135A-135N may receive measurement data from meters 150A-150N according to a predetermined schedule, on an ad hoc basis when the measurement data becomes available, or on a continuous basis. In some embodiments, meters 150A-150N may be incorporated into nodes 135A-135N as an all-in-one unit, a smart meter, an Internet-of-Things device, and the like.

Mesh sub-network 155 may include any conventional or other wireless mesh network, and may conform to a particular standard, such as Institute of Electrical and Electronics Engineers (IEEE) 802.15.5. Nodes 135A-135N and subroot node 105 may communicate wirelessly via mesh sub-network 155. Mesh sub-network 155 may conform to a topology in which individual wireless connections between nodes 135A-135N are arranged according to a directed acyclic graph that ultimately directs transmissions to subroot node 105. In some embodiments, mesh sub-network 155 is a low-power and lossy network (LLN), in which nodes 135A-135N may communicate using a routing protocol for LLNs (RPL).

Subroot node 105 includes a processor 110, a network interface (I/F) 115, memory 120, and storage 130. Memory 120 may include grouping module 125. Network interface 115 may include one or more network interface cards that enable subroot node 105 to send and receive data over one or more networks, such as mesh sub-network 155 and wireless path 157. Subroot node 105 may be a mobile edge computing device or other computing device, including any programmable electronic device capable of executing computer readable program instructions. In some embodiments, subroot node 105 is a computing device belonging to the group of nodes 135A-135N that has been designated to act as a proxy for the remaining nodes. Subroot node 105 may include internal and external hardware components, as depicted and described in further detail hereinafter with respect to FIG. 6.

Grouping module 125 may include one or more modules or units to perform various functions of present invention embodiments described below. Grouping module 125 may be implemented by any combination of any quantity of software and/or hardware modules or units, and may reside within memory 120 of subroot node 105 for execution by a processor, such as processor 110.

Grouping module 125 may receive messages from nodes 135A-135N, aggregate the messages into a single message, and forward the message to a destination. Grouping module 125 may aggregate messages according to a particular template that is specific to the type or category of messages being aggregated. For example, grouping module 125 may use one template to aggregate power restore messages, another template to aggregate Dynamic Host Configuration Protocol (DHCP) requests, and another template to aggregate messages containing data collected from meters 150A-150N. Grouping module 125 may forward the aggregated message along wireless path 157 to root node 160, at which point the aggregated message is forwarded along a wired connection to network 190. The wired connection may include an electrical or optical connection. In some embodiments, when grouping module 125 receives a response to an aggregated message, grouping module 125 may utilize a template to convert the response into individual messages, which are then forwarded to individual nodes 135A-135N.

Storage 130 of subroot node 105 may include any non-volatile storage media known in the art. For example, storage 130 can be implemented with a tape library, optical library, one or more independent hard disk drives, or multiple hard disk drives in a redundant array of independent disks (RAID). Similarly, data in storage 130 may conform to any suitable storage architecture known in the art, such as a file, a relational database, an object-oriented database, and/or one or more tables. Storage 130 may store any data, including templates for aggregating and de-aggregating messages, message data, data about the mesh sub-network and nodes 135A-135N, and any metadata, including times at which messages are received by subroot node 105.

Root node 160 includes a processor 165 and a network interface (I/F) 170. Network interface 170 may include one or more network interface cards that enable subroot node 105 to send and receive data over one or more networks, such as mesh sub-network 155 and wireless path 157. Root node 160 may be a mobile edge computing device or other computing device, including any programmable electronic device capable of executing computer readable program instructions. Unlike other nodes in mesh sub-network 155, root node 160 may have a wired connection to network 190. Thus, root node 160 may enable nodes in wireless mesh networks, such as nodes 135A-135N in mesh sub-network 155, to communicate with external networks, such as an intranet or the Internet. Root node 160 may forward an aggregated message via network 190 to a destination. In some embodiments, root node 160 processes an aggregated message to produce individual messages, which are separately forwarded to a destination. Root node 160 may regenerate individual messages based on an inversion of the template used by subroot node 105 to produce a set of messages that is similar or identical to the set of messages from which the aggregated message was generated. Root node 160 may include internal and external hardware components, as depicted and described in further detail hereinafter with respect to FIG. 6.

Network 190 may include a local area network (LAN), a wide area network (WAN) such as the Internet, or a combination thereof, and includes wired, wireless, or fiber optic connections. In general, network 190 can use any combination of connections and protocols that support communications between root node 160 and any computing devices that have access to network 190, such as a server associated with a utility provider.

Figure 2:
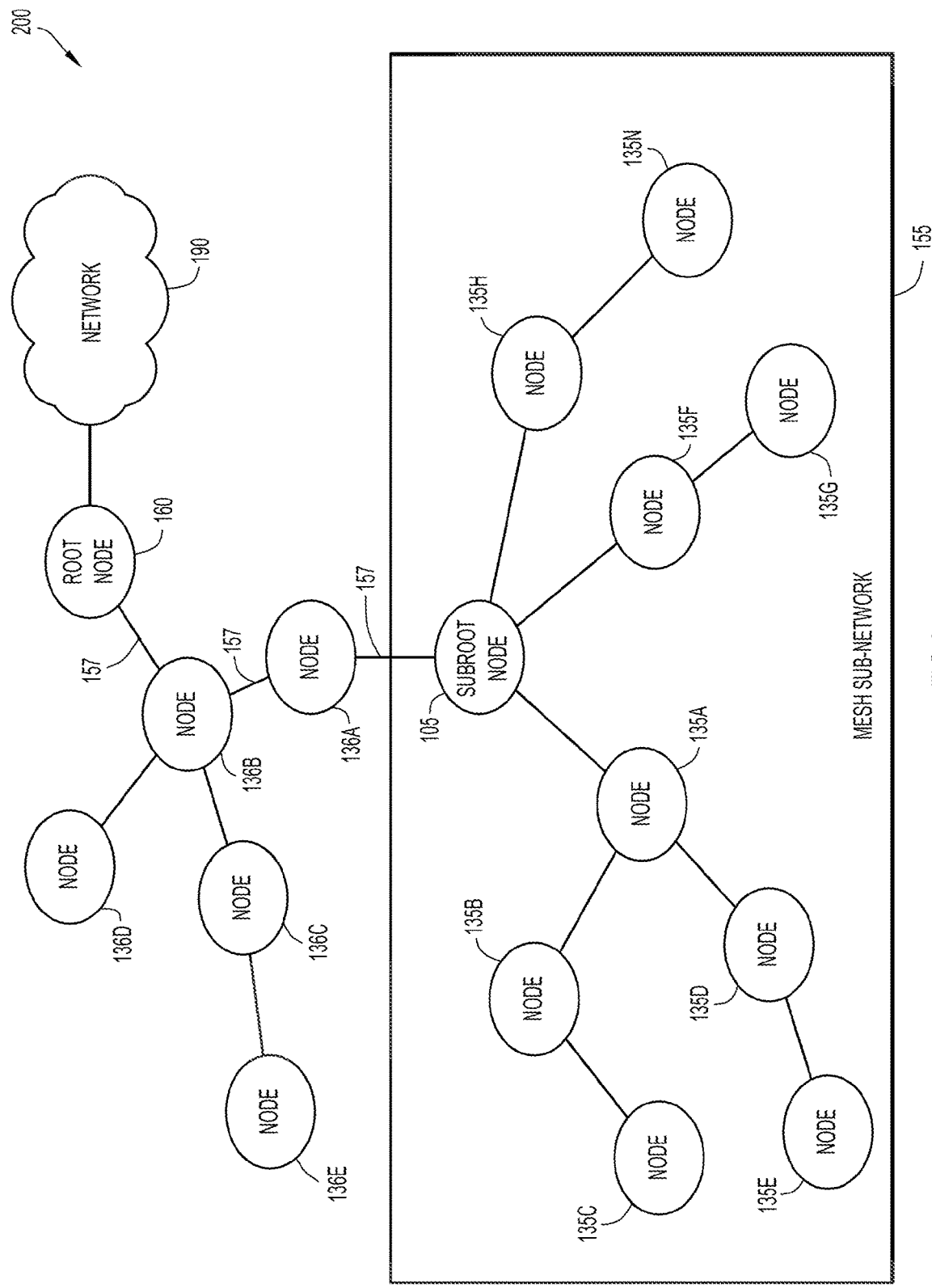
FIG. 2 is a block diagram depicting a wireless mesh network environment, in accordance with an example embodiment.

Reference is now made to FIG. 2. FIG. 2 is a block diagram depicting a network environment 200, in accordance with an example embodiment. As depicted, network environment 200 includes a plurality of nodes 135A-135N in mesh sub-network 155, nodes 136A-136E outside of mesh sub-network 155, a root node 160 with access to network 190, and a subroot node 105 acting as a proxy for nodes in mesh sub-network 155. Each node 135A-135N may be associated with one or more meters from which data may be collected. Nodes 135A-135N may communicate via mesh sub-network 155, and nodes 136A-136E may communicate wirelessly in a similar manner, and may belong to one or more other mesh networks or sub-networks. It is to be understood that the functional division among components of network environment 200 have been chosen for purposes of explaining the embodiments and is not to be construed as a limiting example. In particular, there may be any number of nodes configured according to any directed acyclic graph or other arrangement.

Subroot node 105 may act as a proxy by aggregating messages collected from nodes 135A-135J in mesh sub-network 155. By aggregating multiple messages into a single message, saturation of the link between subroot node 105 and node 136A may be reduced or avoided. Subroot node 105 may route communications to root node 160 via wireless path 157, which may involve one or more hops through intermediary nodes, such as nodes 136A and 136B. In some embodiments, subroot node 105 may engage in direct communication (e.g., without routing communications through intermediary nodes) with root node 160 via the respective wireless interfaces of root node 160 and subroot node 105.

Figure 3:
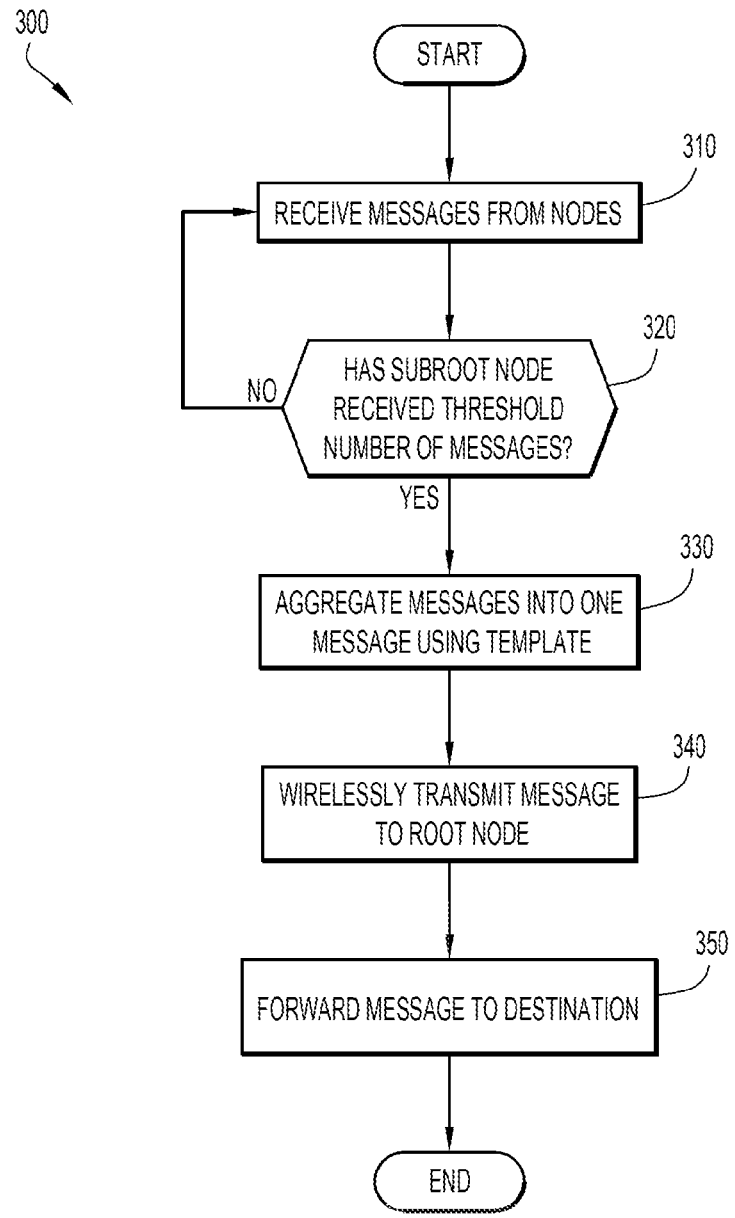
FIG. 3 is a flow chart depicting a method for aggregating messages using a subroot node, in accordance with an example embodiment.

Reference is now made to FIG. 3. FIG. 3 is a flow chart depicting a method 300 for aggregating messages using a subroot node, in accordance with an example embodiment.

Messages from nodes are received by a subroot node at operation 310. Messages may include any data collected by or provided by nodes 135A-135N. In one embodiment, the messages transmitted by nodes 135A-135N to subroot node 105 may be power-on notices that indicate that electrical power has been restored to the nodes and/or meters subsequent to a power outage. In another embodiment, the messages transmitted by nodes 135A-135N to subroot node 105 may include DHCP assignment or renewal requests. In other embodiments, the messages transmitted by nodes 135A-135N to subroot node 105 may include data collected by meters 150A-150N.

Operation 320 determines whether the subroot node has received a threshold number of messages. Subroot node 105 may wait to receive a predetermined threshold number of messages over a particular duration of time before aggregating. For example, if N messages have not yet been not received when time T elapses, then subroot node 105 may aggregate whichever messages were received and may continue to wait for messages from the remaining nodes. When a message is received from a remaining node, the process may restart, with subroot node 105 again waiting to receive N messages before time T elapses. In some embodiments, the threshold number of messages N may be reduced and/or the time-out duration T may be extended for each subsequent cycle. In some embodiments, subroot node 105 may wait to receive a message from every node 135A-135N in mesh sub-network 155 before aggregating the messages. Once the conditions for aggregation are satisfied at operation 320, messages may be aggregated at operation 330. Otherwise, subroot node 105 may continue to receive messages at operation 310.

Multiple messages are aggregated into one message using a template at operation 330. Messages may be aggregated by grouping module 125 of subroot node 105. A template may include instructions that indicate which data in a message should be included in an aggregated message. For example, a template may instruct subroot node 105 to extract, from each power-on notice received, a time at which power was restored and an identifier of the node that sent the message. Extracted data from multiple messages may be aggregated into a single message. In some embodiments, the single message contains a header that includes a destination, and a body that includes data extracted from multiple individual messages. Thus, a template enables relevant data to be passed along to a recipient in a manner that requires a smaller data footprint and reduces saturation at the link between subroot node 105 and a node external to mesh sub-network 155 (e.g., node 136A).

The aggregated message is wirelessly transmitted to a root node at operation 340. The aggregated message may be routed from subroot node 105 to root node 160 via wireless path 157. The aggregated message may pass through one or more other wireless mesh networks or sub-networks before reaching root node 160.

The aggregated message is received by a root node and forwarded to a destination at operation 350. Root node 160 may receive the aggregated message via a wireless network interface, and may forward the aggregated message to a destination using a wired network interface or other interface (such as a fiber-optic interface). In some embodiments, if a destination does not support aggregated messages, root node 160 may reform the individual messages before transmitting separately.

Figure 4:
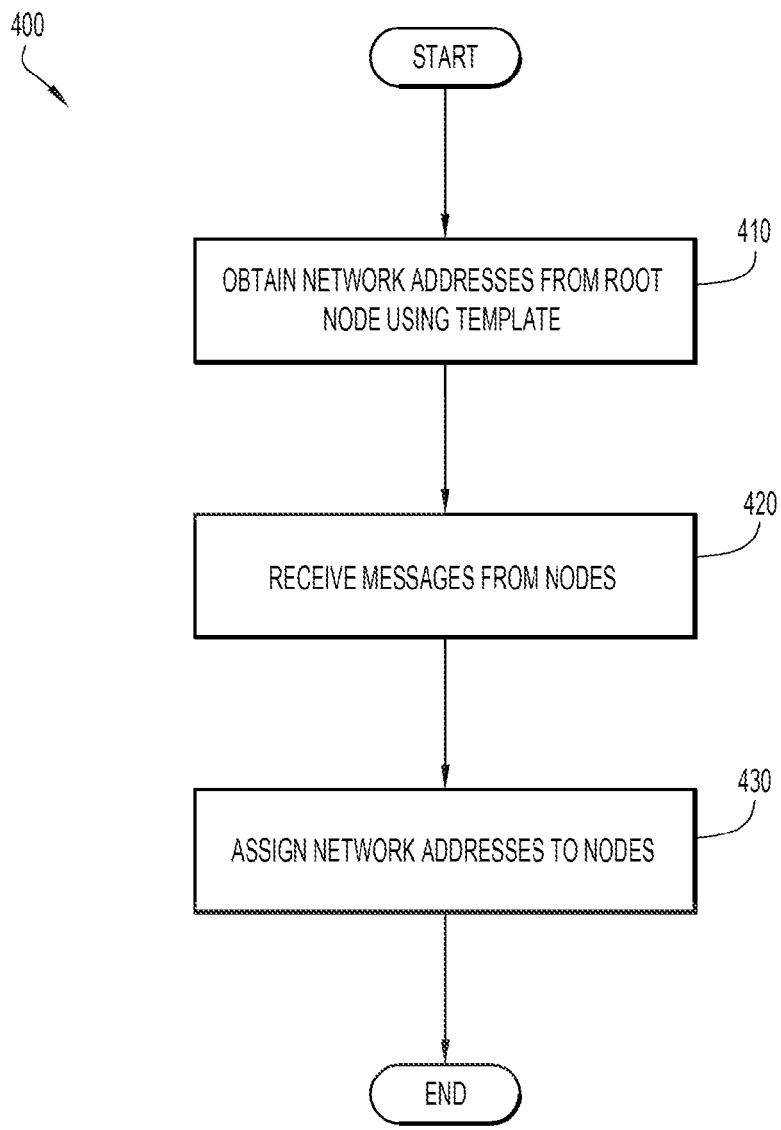
FIG. 4 is a flow chart depicting a method for assigning network addresses to devices using a subroot node, in accordance with an example embodiment.

Reference is now made to FIG. 4. FIG. 4 is a flow chart depicting a method 400 for assigning network addresses to devices using a subroot node, in accordance with an example embodiment. In some embodiments, network addresses include Internet Protocol (IP) version 4 (IPv4) or version 6 (IPv6) addresses, and assignment of addresses is performed according to Dynamic Host Configuration Protocol (DHCP).

A subroot node obtains network addresses from a root node using a template at operation 410. Depending on the instructions of the template, subroot node 105 may obtain a default or predetermined number of unassigned network addresses, or may obtain a number of unassigned network addresses that is equal to a number of nodes in mesh sub-network 155. Subroot node 105 may obtain the group of unassigned network addresses from root node 160. In some embodiments, root node 160 is a DHCP server and subroot node 105 thus functions as a proxy DHCP server.

The subroot node receives messages from nodes at operation 420. Subroot node 105 may receive messages from nodes 135A-135N. Each received message may include a request to be assigned a network address (e.g., a DHCP request) or a request to renew a network address (e.g., a request to renew a DHCP lease).

Network addresses are assigned to nodes at operation 430. Subroot node 105 may assign (or renew) addresses to requesting nodes as the requests are received. Network addresses may be assigned from the pool of addresses that subroot node 105 received from root node 160 at operation 410.

According to one embodiment, subroot node 105 boots and requests from root node 160 a default number of addresses (e.g., one hundred addresses) as indicated in a template. A first node, node 135A, boots and requests assignment of a network address from subroot node 105. Subroot node 105 may delay its answer to the request of node 135A, as subroot node 105 has not yet received a response from root node 160 containing the group of addresses. Another node, such as node 135B, may boot and send a request for a network address to subroot node 105, which again delays its answer. Once subroot node 105 receives the hundred requested addresses, subroot node 105 may respond to nodes 135A and 135B by assigning network addresses to each, leaving 98 unassigned network addresses in the pool of addresses managed by subroot node 105. As subroot node 105 continues to receive subsequent requests from nodes in mesh sub-network 155, subroot node 105 may respond with network address assignments.

When the pool of unassigned addresses goes below a predetermined threshold, subroot node 105 may request additional unassigned network addresses from root node 160. This request may be made according to a template, which may provide subroot node 105 with a threshold and a default number of addresses to request. For example, the template may instruct subroot node 105 to request additional addresses when only 25% or less of the pool of addresses remain unassigned. In some embodiments, the template may instruct subroot node 105 to request a different number of addresses when subsequent requests are made from root node 160. For example, subroot node 105 may initially make a request for one hundred unassigned network addresses, and once subroot node 105 has assigned a predetermined number (e.g., 75%) of those addresses to nodes, subroot node 105 may transmit an additional request for network addresses to root node 160, this time for two hundred addresses.

Figure 5:
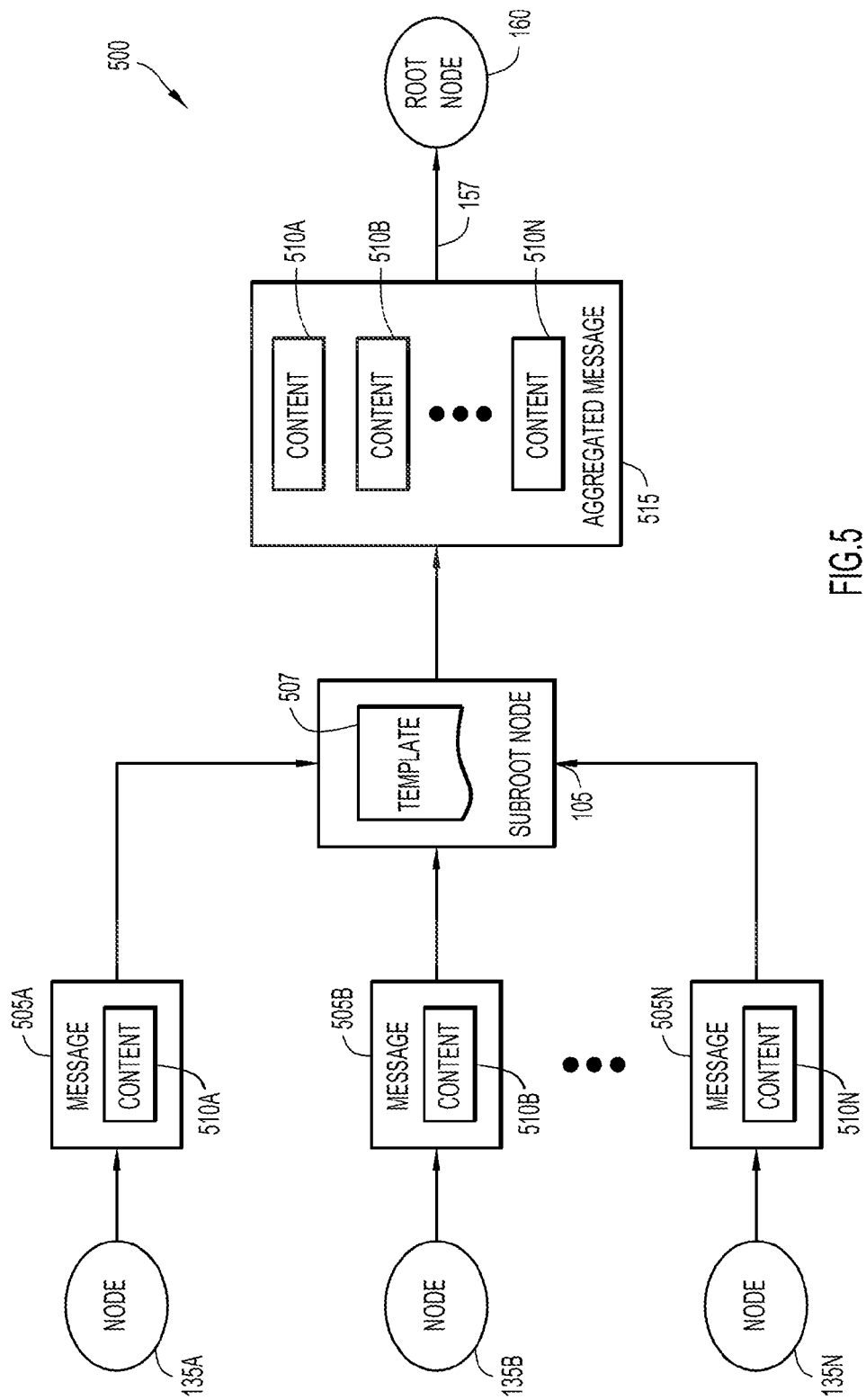
FIG. 5 is a flow diagram depicting aggregation of messages, in accordance with an example embodiment.

Reference is now made to FIG. 5. FIG. 5 is a flow diagram 500 depicting aggregation of messages, in accordance with an example embodiment. As depicted, flow diagram 500 includes a plurality of nodes 135A-135N, each transmitting a message 505A-505N to subroot node 105. Subroot node 105 uses template 507 to generate aggregated message 515, which is routed along wireless path 157 to root node 160.

Each message 505A-505N transmitted by corresponding nodes 135A-135N includes content 510A-510N. When subroot node 105 receives messages 505A-505N, subroot node 105 may determine which type of message is received in order to apply a corresponding template. For example, subroot node 105 may utilize one template for DHCP requests and another template for power-on notices. Subroot node 105 may receive templates from root node 160. In some embodiments, subroot node 105 receives updated templates from root node 160 on a predetermined basis or on an ad hoc basis when updates become available.

Template 507 may be expressed using an extension of the Internet Engineering Task Force (IETF) Static Context Header Compression (SCHC) protocol, which provides instructions to generate multiple messages.

Once a template 507 is selected, subroot node 105 uses the template 507 to extract specified information from messages 505A-505N. For example, template 507 may specify to extract content 510A from message 505A, content 510B from message 505B, and the like. Thus, subroot node 105 forms aggregated message 515 that includes extracted content 510A-510N from each of the received messages 505A-505N. Since aggregated message 515 only includes extracted content from messages, the size (e.g., as measured in bits, bytes, etc.) of aggregated message 515 may be smaller than the sum total size of messages 505A-505N. In some embodiments, each message 505A-505N and aggregated message 515 corresponds to an IP packet or a group of IP packets.

Reference is now made to FIG. 6. FIG. 6 is a block diagram depicting components of a computer 600 suitable for executing the methods disclosed herein. Computer 600 may implement subroot node 105, nodes 135A-135N, and/or root node 160 in accordance with embodiments presented herein. It should be appreciated that FIG. 6 provides only an illustration of one embodiment and does not imply any limitations with regard to the environments in which different embodiments may be implemented. Many modifications to the depicted environment may be made.

As depicted, the computer 600 includes communications fabric 612, which provides communications between computer processor(s) 614, memory 616, persistent storage 618, communications unit 620, and input/output (I/O) interface(s) 622. Communications fabric 612 can be implemented with any architecture designed for passing data and/or control information between processors (such as microprocessors, communications and network processors, etc.), system memory, peripheral devices, and any other hardware components within a system. For example, communications fabric 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. The memory 616 may store the software instructions for grouping module 125 in performing the operations described herein.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to computer 10. For example, I/O interface 622 may provide a connection to external devices 628 such as a keyboard, keypad, a touch screen, and/or some other suitable input device. External devices 628 can also include portable computer readable storage media such as, for example, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to aggregating messages using a subroot node (e.g., template data, messages, mesh sub-network node membership data, message data, aggregated message data, network address data, etc.) may be stored within any conventional or other data structures (e.g., files, arrays, lists, stacks, queues, records, etc.) and may be stored in any desired storage unit (e.g., database, data or other repositories, queue, etc.). The data transmitted between meters 150A-150N, nodes 135A-135N, subroot node 105, root node 160, wireless path 157, and/or network 190 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to aggregating messages using a subroot node (e.g., template data, messages, mesh sub-network node membership data, message data, aggregated message data, network address data, etc.) may include any information provided to, or generated by, meters 150A-150N, nodes 135A-135N, subroot node 105, and root node 160. Data relating to aggregating messages using a subroot node may include any desired format and arrangement, and may include any quantity of any types of fields of any size to store any desired data. The data relating to aggregating messages using a subroot node may include any data collected about entities by any collection means, any combination of collected information, and any information derived from analyzing collected information.

The present embodiments may employ any number of any type of user interface (e.g., representational state transfer (REST) application programming interfaces (API), Graphical User Interface (GUI), command-line, prompt, etc.) for obtaining or providing information (e.g., data relating to aggregating messages using a subroot node), where the interface may include any information arranged in any fashion. The interface may include any number of any types of input or actuation mechanisms (e.g., REST APIs, buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of providing a communication proxy for devices in a mobile edge computing network.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., grouping module 125, etc.). These systems may include any types of monitors and input devices (e.g., keyboard, mouse, voice recognition, etc.) to enter and/or view information.

It is to be understood that the software (e.g., grouping module 125, etc.) of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments (e.g., grouping module 125, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to aggregating messages using a subroot node). The database system may be implemented by any number of any conventional or other databases, data stores or storage structures (e.g., files, databases, data structures, data or other repositories, etc.) to store information (e.g., data relating to aggregating messages using a subroot node). The database system may be included within or coupled to the server and/or client systems. The database systems and/or storage structures may be remote from or local to the computer or other processing systems, and may store any desired data (e.g., data relating to aggregating messages using a subroot node).

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the present embodiments in the form disclosed. Many modifications and variations will be apparent to those of ordinary skill in the art without departing from the scope and spirit of the presented embodiments. The embodiment was chosen and described in order to best explain the principles of the presented embodiments and the practical application, and to enable others of ordinary skill in the art to understand various embodiments with various modifications as are suited to the particular use contemplated.

The descriptions of the various embodiments of the present embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of the presented embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, RAM, ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one form, a computer-implemented method is provided comprising: receiving, by a subroot node acting as a proxy in a wireless mesh sub-network, a plurality of messages from a corresponding plurality of nodes; aggregating, the plurality of messages into a single message according to a template; and wirelessly transmitting the single message to a root node, wherein the root node has a wired connection to a network. The template may include instructions to request a plurality of unassigned Internet Protocol (IP) addresses from the root node, and the computer-implemented method may further include obtaining, by the subroot node, the requested plurality of unassigned IP addresses from the root node; and in response to receiving a DHCP request from a node, assigning an IP address to the node. The computer-implemented method may further include determining that a threshold number of IP addresses of the plurality of unassigned IP addresses has been assigned; and in response to determining that the threshold number of IP addresses has been assigned, sending, to the root node, a second request for a plurality of unassigned IP addresses.

In one form, the template may include instructions to aggregate power-on notice messages into the single message, wherein a power-on notice message indicates that power has been restored to a node. In another form, the template may be received by the subroot node from the root node.

In one form, the single message is routed from the subroot node to the root node along a path of a second wireless mesh network.

The computer-implemented method may further include determining that a duration of time has elapsed before the subroot node has received a message from a threshold number of nodes of the plurality of nodes; and in response to determining that the duration of time has elapsed, aggregating the plurality of messages, wherein the plurality of messages are received by the subroot node before the duration of time has elapsed.

In one form, each message of the plurality of messages includes data collected by one or more meters.

In another form, an apparatus is provided comprising: a communication interface configured to enable network communications; one or more computer processors; one or more computer readable storage media; program instructions stored on the one or more computer readable storage media for execution by at least one of the one or more computer processors, that when executed by the one or more computer processors, cause the one or more computer processors to: receive, by a subroot node acting as a proxy in a wireless mesh sub-network, a plurality of messages from a corresponding plurality of nodes; aggregate, the plurality of messages into a single message according to a template; and wirelessly transmit the single message to a root node, wherein the root node has a wired connection to a network.

In another form, one or more non-transitory computer readable storage media are provided that are encoded with instructions that, when executed by one or more processors, cause the one or more processors to: receive, by a subroot node acting as a proxy in a wireless mesh sub-network, a plurality of messages from a corresponding plurality of nodes; aggregate, the plurality of messages into a single message according to a template; and wirelessly transmit the single message to a root node, wherein the root node has a wired connection to a network.

In summary, the techniques presented herein solve issues involving communication difficulties experienced by nodes in a wireless mesh network. This approach forms a sub-network of nodes in which a node (or multiple nodes) acts as a subroot node for other nodes in the vicinity. The subroot node may serve as a proxy between the nodes in the sub-network and an external node by serializing upstream communications. Rather than sending multiple messages individually, which can overload mesh networks, the subroot node may aggregate messages received from each node into a single message. The subroot node may serve as a proxy by aggregating multiple requests of nodes to be assigned network addresses. Thus, techniques presented herein reduce the amount of collisions and related delays in a mobile edge computing network, as well as reducing congestion at links between subroot nodes and external nodes. Moreover, by eliminating the need for nodes to transmit at higher power levels, the power consumption of nodes may be reduced, which is particularly beneficial in the case of battery-powered devices.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a subroot node acting as a proxy in a wireless mesh sub-network, a plurality of messages from a corresponding plurality of nodes;
aggregating the plurality of messages into a single message according to a template, wherein the template comprises instructions to request a plurality of unassigned network addresses from a root node;
obtaining, by the subroot node, the plurality of unassigned network addresses from the root node;
in response to receiving a network address request from a node, assigning a network address to the node; and
wirelessly transmitting the single message to the root node, wherein the root node has a wired connection to a network.

2. The computer-implemented method of claim 1, further comprising:
determining that a threshold number of network addresses of the plurality of unassigned network addresses has been assigned; and
in response to determining that the threshold number of network addresses has been assigned, sending, to the root node, a second request for a plurality of unassigned network addresses.

3. The computer-implemented method of claim 1, wherein the template comprises instructions to aggregate power-on notice messages into the single message, wherein a power-on notice message indicates that power has been restored to a node.

4. The computer-implemented method of claim 1, wherein the template is received by the subroot node from the root node.

5. The computer-implemented method of claim 1, wherein the single message is routed from the subroot node to the root node along a path of a second wireless mesh network.

6. The computer-implemented method of claim 1, further comprising:
determining that a duration of time has elapsed before the subroot node has received a message from a threshold number of nodes of the plurality of nodes; and
in response to determining that the duration of time has elapsed, aggregating the plurality of messages, wherein the plurality of messages are received by the subroot node before the duration of time has elapsed.

7. The computer-implemented method of claim 1, wherein each message of the plurality of messages includes data collected by one or more meters.

8. The computer-implemented method of claim 1, wherein the root node processes the single message according to an inversion of the template to regenerate the plurality of messages.

9. The computer-implemented method of claim 1, wherein the plurality of unassigned network addresses comprises a plurality of unassigned Internet Protocol (IP) addresses, and wherein the network address request received from the node comprises a Dynamic Host Configuration Protocol (DHCP) request.

10. An apparatus comprising:
a communication interface configured to enable network communications;
one or more computer processors;
one or more computer readable storage media;
program instructions stored on the one or more computer readable storage media for execution by at least one of the one or more computer processors, that when executed by the one or more computer processors, cause the one or more computer processors to:
receive, by a subroot node acting as a proxy in a wireless mesh sub-network, a plurality of messages from a corresponding plurality of nodes;
aggregate the plurality of messages into a single message according to a template, wherein the template comprises instructions to request a plurality of unassigned network addresses from a root node;
obtain, by the subroot node, the plurality of unassigned network addresses from the root node;
in response to receiving a network address request from a node, assign a network address to the node; and
wirelessly transmit the single message to a root node, wherein the root node has a wired connection to a network.

11. The apparatus of claim 10, wherein the program instructions further cause the one or more computer processors to:
determine that a threshold number of network addresses of the plurality of unassigned network addresses has been assigned; and
in response to determining that the threshold number of network addresses has been assigned, send, to the root node, a second request for a plurality of unassigned network addresses.

12. The apparatus of claim 10, wherein the template comprises instructions to aggregate power-on notice messages into the single message, wherein a power-on notice message indicates that power has been restored to a node.

13. The apparatus of claim 10, wherein the template is received by the subroot node from the root node.

14. The apparatus of claim 10, wherein the single message is routed from the subroot node to the root node along a path of a second wireless mesh network.

15. The apparatus of claim 10, wherein the program further cause the one or more computer processors to:
determine that a duration of time has elapsed before the subroot node has received a message from a threshold number of nodes of the plurality of nodes; and
in response to determining that the duration of time has elapsed, aggregate the plurality of messages, wherein the plurality of messages are received by the subroot node before the duration of time elapsed.

16. The apparatus of claim 10, wherein the plurality of unassigned network addresses comprises a plurality of unassigned Internet Protocol (IP) addresses, and wherein the network address request received from the node comprises a Dynamic Host Configuration Protocol (DHCP) request.

17. One or more non-transitory computer readable storage media encoded with instructions that, when executed by one or more processors, cause the one or more processors to:
receive, by a subroot node acting as a proxy in a wireless mesh sub-network, a plurality of messages from a corresponding plurality of nodes;
aggregate the plurality of messages into a single message according to a template wherein the template comprises instructions to request a plurality of unassigned network addresses from a root node;
obtain, by the subroot node, the plurality of unassigned network addresses from the root node;
in response to receiving a network address request from a node, assign a network address to the node; and
wirelessly transmit the single message to a root node, wherein the root node has a wired connection to a network.

18. The one or more non-transitory computer readable storage media of claim 17, wherein the instructions further cause the one or more processors to:
determine that a threshold number of network addresses of the plurality of unassigned network addresses has been assigned; and
in response to determining that the threshold number of network addresses has been assigned, send, to the root node, a second request for a plurality of unassigned network addresses.

19. The one or more non-transitory computer readable storage media of claim 17, wherein the template comprises instructions to aggregate power-on notice messages into the single message, wherein a power-on notice message indicates that power has been restored to a node.

20. The one or more non-transitory computer readable storage media of claim 17, wherein the plurality of unassigned network addresses comprises a plurality of unassigned Internet Protocol (IP) addresses, and wherein the network address request received from the node comprises a Dynamic Host Configuration Protocol (DHCP) request.

* * * * *